United States Patent
Chergui

(10) Patent No.: US 10,179,371 B2
(45) Date of Patent: Jan. 15, 2019

(54) METHOD AND DEVICE FOR RESISTANCE WELDING OF SANDWICH-TYPE PLATES USING A SECOND ELECTRICAL CIRCUIT

(71) Applicant: THYSSENKRUPP STEEL EUROPE AG, Duisburg (DE)

(72) Inventor: Azeddine Chergui, Dortmund (DE)

(73) Assignee: THYSSENKRUPP STEEL EUROPE AG, Duisburg (DE)

(*) Notice: Subject to any disclaimer, the term of this patent is extended or adjusted under 35 U.S.C. 154(b) by 139 days.

(21) Appl. No.: 14/910,004

(22) PCT Filed: Aug. 7, 2014

(86) PCT No.: PCT/EP2014/067041
§ 371 (c)(1),
(2) Date: Feb. 4, 2016

(87) PCT Pub. No.: WO2015/018916
PCT Pub. Date: Feb. 12, 2015

(65) Prior Publication Data
US 2016/0184919 A1   Jun. 30, 2016

(30) Foreign Application Priority Data
Aug. 8, 2013   (DE) .......................... 10 2013 108 563

(51) Int. Cl.
*B23K 11/11*   (2006.01)
*B23K 11/16*   (2006.01)
(Continued)

(52) U.S. Cl.
CPC ......... *B23K 11/115* (2013.01); *B23K 11/0026* (2013.01); *B23K 11/16* (2013.01);
(Continued)

(58) Field of Classification Search
CPC ... B23K 11/0026; B23K 11/115; B23K 11/16; B23K 11/34; B23K 11/24
(Continued)

(56) References Cited

U.S. PATENT DOCUMENTS 4,072,843 A * 2/1978 Szabo ................. B23K 11/163
219/91.1
4,650,951 A   3/1987 Koga et al.
(Continued)

FOREIGN PATENT DOCUMENTS

DE   102010061502 A1   1/2012
DE   102011100495 A1   11/2012
(Continued)

OTHER PUBLICATIONS

English language Abstract for DE 102010061502 A1 listed above.
(Continued)

*Primary Examiner* — Ibrahime A Abraham
*Assistant Examiner* — John J Norton
(74) *Attorney, Agent, or Firm* — thyssenkrupp North America, Inc.

(57) ABSTRACT

Devices and methods for resistance-welding a metallic component to a sandwich sheet having a thermoplastic layer disposed between two metallic cover layers may involve heating a region of the sandwich sheet to be welded such that the thermoplastic layer softens. The cover layers of the sandwich sheet may then be compressed so as to displace the thermoplastic layer from the region of the sandwich sheet to be welded. Electrical circuitry may then be employed to interconnect the metallic cover layers and the metallic component by passing a current through a pair of electrodes positioned on opposing sides of a combination including the sandwich sheet and the metallic component.

7 Claims, 5 Drawing Sheets

(51) Int. Cl.
  *B23K 11/24* (2006.01)
  *B23K 11/34* (2006.01)
  *B23K 11/00* (2006.01)
  *B23K 101/18* (2006.01)
  *B23K 103/16* (2006.01)
  *B23K 103/18* (2006.01)

(52) U.S. Cl.
  CPC .............. *B23K 11/24* (2013.01); *B23K 11/34* (2013.01); *B23K 2101/185* (2018.08); *B23K 2103/172* (2018.08); *B23K 2103/18* (2018.08)

(58) Field of Classification Search
  USPC .............................................. 219/91.21, 86.1
  See application file for complete search history.

(56) References Cited

U.S. PATENT DOCUMENTS

| | | | |
|---|---|---|---|
| 5,866,868 A | | 2/1999 | Hirane |
| 6,359,249 B1* | | 3/2002 | Brown ................ B21D 39/021 219/86.31 |
| 2009/0278371 A1 | | 11/2009 | Fuchs |
| 2011/0188927 A1* | | 8/2011 | Mizrahi ................ B23K 11/115 403/271 |

| | | | | |
|---|---|---|---|---|
| 2014/0224774 A1 | | 8/2014 | Chergui et al. | |

FOREIGN PATENT DOCUMENTS

| | | | | |
|---|---|---|---|---|
| DE | 102011109708 A1 | | 2/2013 | |
| JP | 61115687 A | * | 6/1986 | .............. B23K 11/16 |
| JP | S61115687 A | | 6/1986 | |
| JP | S6281276 A | | 4/1987 | |
| JP | H04-274885 A | | 9/1992 | |
| JP | H106020 A | | 1/1998 | |
| JP | 2008-105041 A | | 5/2008 | |
| JP | 2008272825 A | * | 11/2008 | |
| JP | 6171188 B | | 8/2017 | |

OTHER PUBLICATIONS

Int'l Search Report for PCT/EP2014/067041 dated Nov. 18, 2014 (dated Nov. 27, 2014).
English Abstract for JPS61115687.
English Abstract for JP2008272825.
English Abstract of DE102011109708.
English Abstract of JPS6281276.
Japanese Office Action issued in corresponding application No. 2016-532696, dated Jun. 6, 2018. [English translation unavailable].

* cited by examiner

US 10,179,371 B2

METHOD AND DEVICE FOR RESISTANCE WELDING OF SANDWICH-TYPE PLATES USING A SECOND ELECTRICAL CIRCUIT

CROSS REFERENCE TO RELATED APPLICATIONS

This application is a U.S. National Stage Entry of International Patent Application Serial Number PCT/EP2014/067041, filed Aug. 7, 2014, which claims priority to German Patent Application No. DE 102013108563.6 filed Aug. 8, 2013, the entire contents of both of which are incorporated herein by reference.

FIELD

The present disclosure relates to devices and methods for resistance-welding metallic components to multilayered sheets having a thermoplastic layer.

BACKGROUND

The increasing demand for lightweight construction concepts in automotive engineering lends prominence to the use of sandwich sheets which between two thin metallic cover layers have a thermoplastic plastics layer, in order for the potential for saving weight in automotive engineering to be further expanded by using sandwich sheets. Sandwich sheets may have various and mutually exclusive properties which open up new potentials for saving weight. In this way, on account of the plastics layer, sandwich sheets have a significantly lower weight than solid metal sheets and at the same time provide high strength values. Moreover, sandwich sheets are sound absorbing and offer high rigidity. However, it is disadvantageous in sandwich sheets that the latter have an electrically isolating plastics layer which in melt-welding methods causes problems in terms of configuring a flawless welded connection. On account of the inadequate suitability of the sandwich sheets for welding, for example for resistance-welding to other metallic components, sandwich sheets are therefore often adhesively bonded or mechanically joined.

A method for joining a sandwich sheet and a further metallic component, in which the intermediate layer in the connection region is melted and is displaced from the connection region, such that a welded connection may be generated by subsequently establishing electrical contact between the component and the cover layers of the sandwich sheet is disclosed in the German unexamined and first patent publication DE 10 2011 109 708 A1. It is proposed that heating of the joint regions is carried out by electrodes or pressing elements which are capable of being temperature controlled. To this end, the welding electrodes or pressing elements are provided with heating elements, for example. The construction of the welding electrodes thus becomes comparatively complex. Moreover, the speed of heating of the thermoplastic plastics layer may be even further accelerated, such that shorter cycle times may be achieved.

Moreover, a method for resistance-welding two composite sheets, which uses two welding electrodes which are heated and thus heat and displace the plastics layer lying between the cover layers prior to actual welding commencing, is disclosed in US patent document U.S. Pat. No. 4,650,951.

Therefore, a need exists for devices and methods for resistance-welding sandwich sheets and a respective device by way of which a joint between a sandwich sheet and a further component may be provided at low cycle times.

DETAILED DESCRIPTION

Figure 1:
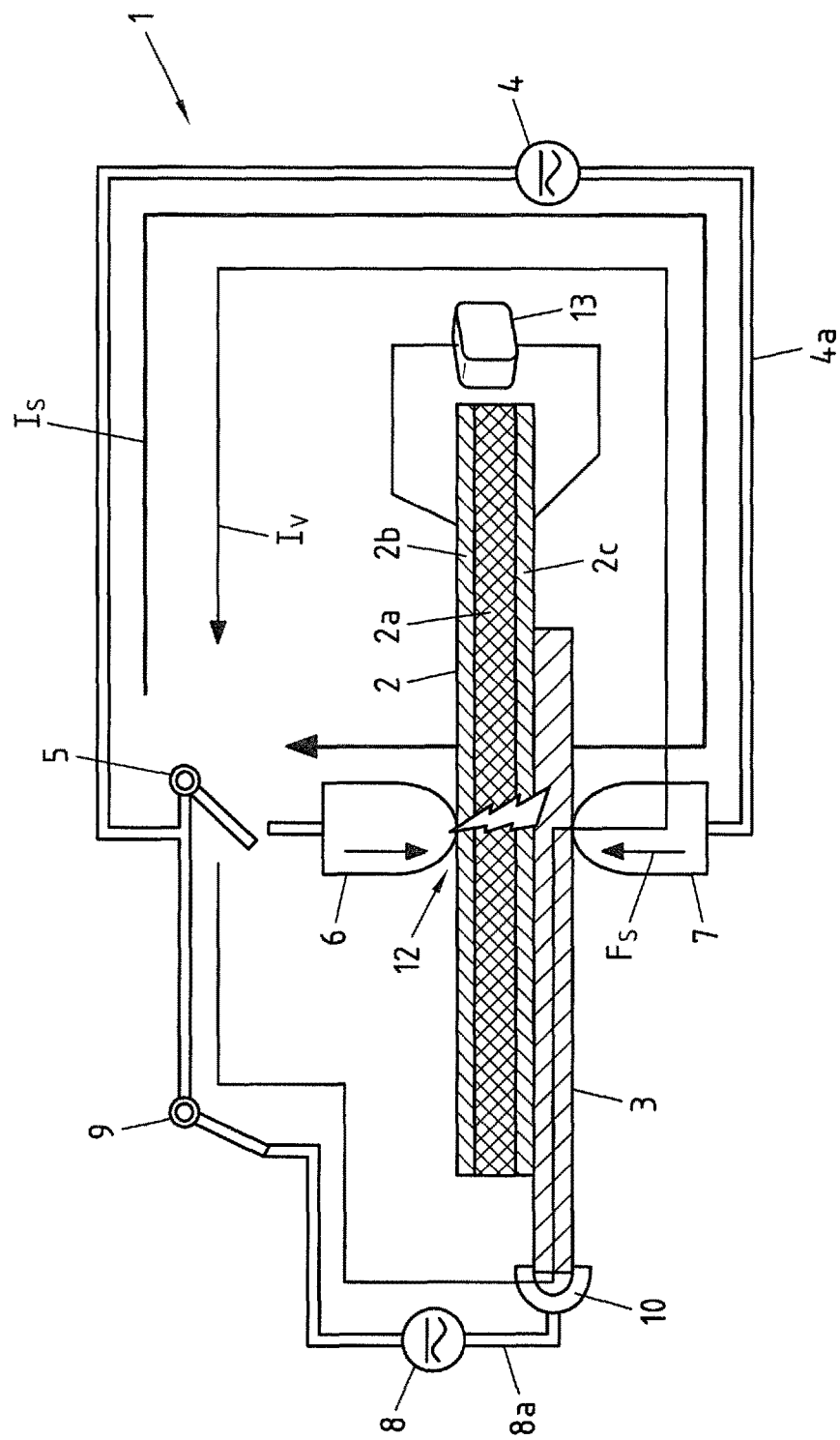
FIG. 1 is a sectional schematic view of an example device for resistance-welding an example sandwich sheet to an example metallic component.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns devices and methods for resistance-welding a sandwich sheet to at least one metallic component. In some examples, the sandwich sheet may have two metallic cover layers and a thermoplastic plastics layer disposed between the metallic cover layers. As those having ordinary skill in the art will understand, a thermoplastic plastics layer may also be referred to more succinctly as a thermoplastic layer. In any event, some example methods may involve heating at least a region of the sandwich sheet that is to be welded in such a manner that the thermoplastic layer is softened and displaced from the welding region by compressing the cover layers. Moreover, the cover layers and the metallic component may be interconnected by an electrical current flowing in a first electrical circuit through a first and second welding electrode, the second welding electrode of which may be in contact with the metallic component.

Furthermore, one example object of the present disclosure may be achieved in that a second electrical circuit which comprises the second welding electrode, the metallic component which is to be welded to the sandwich sheet, and a current bridge leading to the component is provided; that the second welding electrode is disposed so as to be opposite the first welding electrode on that side of the component that faces away from the sandwich sheet; and that at least the region of the sandwich sheet that is to be welded in the region of the second welding electrode is heated by a current flow in the second electrical circuit.

It has been demonstrated that heating of the welding region, which moreover may be variably set by way of the current rating of the pre-heating current, may be achieved in a simple manner if and when a second electrical circuit which by way of the second welding electrode in the welding region directs current via the component is used.

The cycle times may be reduced by using the second electrical circuit, such that a method which is overall more economical may be provided. Moreover, conventional welding electrodes may be used, for example, in resistance-welding devices or in resistance-welding tongs, respectively.

According to a first design embodiment of the method, the cover layers of the sandwich sheet are compressed by force impingement of the first and second welding electrodes. On account thereof, it is achieved that the method according to the invention may be carried out in a simple manner by a welding robot having correspondingly configured means for impinging the welding electrodes with a force. For example, the welding electrodes may be part of welding tongs, for example spot-welding tongs.

According to a further design embodiment of the method, the second electrical circuit is interrupted during the welding procedure. On account thereof, the risk of secondary electrical currents between the electrical current sources of the first and second electrical circuits via the component and the sandwich sheet is prevented.

According to a further design embodiment of the method, resistance measuring is preferably carried out during welding, wherein the electrical resistance between the two metallic cover layers of the sandwich sheet is measured. By measuring the resistance between the metallic cover layers of the lightweight sheet it may be determined, for example, when there is metallic contact between the metallic cover layers and when electrical resistance abruptly drops.

According to a further design embodiment of the method, the current in the first and/or in the second electrical circuit is controlled so as to depend on resistance measuring. For example, the electrical currents of the two electrical circuits may be controlled in such a manner that a drop in the resistance in the second electrical circuit to almost zero, that is to say when contact between the two metallic cover layers is established, the electrical circuit of the second electrical circuit, which is used for pre-heating, is interrupted and the first electrical circuit, which is used for configuring the resistance-welding point, is closed. The temporal profile of the welding current or of the pre-heating current, respectively, may likewise be controlled so as to depend on resistance measuring. Thus, optimization of the method in terms of as short a cycle time as possible may be obtained by resistance measuring.

According to a second teaching of the present invention, the object outlined is achieved by a device for resistance-welding sandwich sheets to a further metallic component is achieved in that means for providing at least one second electrical circuit are provided, wherein the electrical circuit comprises at least the second welding electrode in contact with the component, and at least partially the component and an electrical bridge to the component, wherein the contact region between the second welding electrode and the component is configured such that said contact region may be heated by way of the current flow in the second electrical circuit.

As has already been set forth above, the use of a second electrical circuit leads to the welding region being able to be heated with simple means and in a very short time in such a manner that the plastics layer of the sandwich sheet may be softened and displaced from the welding region. The contact region between the second welding electrode and the component may have a very small contact area, for example, such that a high current density is generated in a localized manner in the contact region between the second welding electrode and the component, leading to fast warming of the contact region or the welding region, respectively, including the plastics layer of the sandwich sheet in this region.

Preferably, the first welding electrode is provided as a means for displacing the plastics layer of the sandwich sheet, and the first welding electrode for displacing the plastics layer of the sandwich sheet may be impinged with a force.

The device is preferably configured as welding tongs, such that said device may be used by a welding robot for automatically joining the sandwich sheets, for example.

If and when means for measuring the electrical resistance between the metallic cover layers of the sandwich sheet are provided, it may be determined in a simple manner whether the two metallic cover layers have already established mutual metallic contact.

According to a further design embodiment, contact between the metallic cover layers may be used for controlling the sequence of the welding method in that a controller which controls the current flow in the first electrical circuit and/or in the second electrical circuit so as to be at least dependent on the measurement of electrical resistance between the metallic cover layers is provided. On account thereof, further automation and optimization of resistance-welding of sandwich sheets is achieved.

A controller by way of which a constant current flow in the first and/or in the second electrical circuit may at least occasionally be generated is preferably provided. Both the pre-heating process as well as resistance-welding per se may be particularly readily controlled and carried out in a reproducible manner by setting a constant maximum electrical current.

If and when the electrical bridge according to a further design embodiment of the device is configured as a contact electrode which is in contact with the metallic component, contact between said device and the metallic component may be established and the electrical circuit for the pre-heating current may be provided in a simple manner, for example by pressing said device against the metallic component.

Preferably, a handling system, a gantry system, or a robot for positioning is provided for positioning the electrical bridge, such that an arbitrary position of the electrical bridge on the metallic component, in particular in conjunction with the given welding position, may be utilized so as to implement as short a current path as possible for the pre-heating current.

According to a further design embodiment of the device, positioning close to the welding electrode which is in contact with the metallic component is performed in a particularly simple manner in that the electrical bridge which is configured as a contact electrode is disposed so as to be fixedly spaced from the second welding electrode and is preferably connected to the latter in a mechanically fixed manner. For example, the contact electrode is automatically positioned on the component when the welding electrode is positioned on the component.

Firstly, FIG. 1 shows an exemplary embodiment of a device 1 according to the invention for resistance-welding sandwich sheet 2 to a further metallic component 3, presently a component made from a solid material. Moreover, the device 1 has means 4, 5 for providing a first electrical circuit which directs the welding current via the electrodes 6 and 7. For example, the means or general electrical circuitry may be comprised of, amongst other things, a voltage source or current source 4, respectively, the associated electrical lines 4a, and a switch 5 for interrupting the first electrical circuit. Moreover, means for displacing the plastics layer of the lightweight sheet from that region of the lightweight sheet that is to be welded are provided in the form of the welding electrode 6. Means for impinging the welding electrode 6 with a force in the direction of the connection partner 3, indicated in FIG. 1 by an arrow, are not illustrated in FIG. 1, such that the plastics layer may be displaced from the welding region between the two welding electrodes 6, 7 when the plastics layer between two welding electrodes 6, 7 is softened. Moreover, means or general electrical circuitry for providing at least one second electrical circuit may be comprised of, amongst other things, a voltage source or current source 8, respectively, having the associated current-directing lines 8a and a switch 9 by way of which the second electrical circuit via the second welding electrode 7 and an electrical contact in the form of an electrical bridge 10 via the component 3 may be closed, are present.

In FIG. 1, the two electrical circuits are identified with $I_V$ for the electrical pre-heating circuit and $I_S$ for the electrical welding circuit. Using the electrical pre-heating circuit $I_V$, the welding region 12 is heated by the current flow in the contact region between the welding electrode and the component 3 so intensely that the plastics layer 2a which is disposed between the metallic cover layers 2b of the sandwich sheet 2 is heated and softened. By exerting a force by way of the welding electrodes 6, 7 on the welding region 12, the plastics are displaced from the welding region 12. A substantially metal-only contact between the metallic cover layers 2b and 2c arises.

As soon as the metallic contact has been established, the electrical circuit for the welding current $I_S$ may be closed, such that the welding current is provided via the current source or voltage source 4, respectively. The metallic cover layers 2b, 2c are resistance-welded to the component 3 by way of the welding current. The electrical pre-heating circuit may preferably be interrupted again once the welding current has been switched on. Additionally, means 13 for resistance measuring between the metallic cover layers 2b, 2c, by way of which the welding current $I_S$ or the pre-heating current $I_V$, respectively, may be preferably controlled, are provided. For example, the pre-heating current $I_V$ may be switched off and the welding current $I_S$ may be switched on when the electrical resistance drops. On account thereof, very short cycle times and an optimal point in time for switching on the welding current may be guaranteed.

Figure 2A:
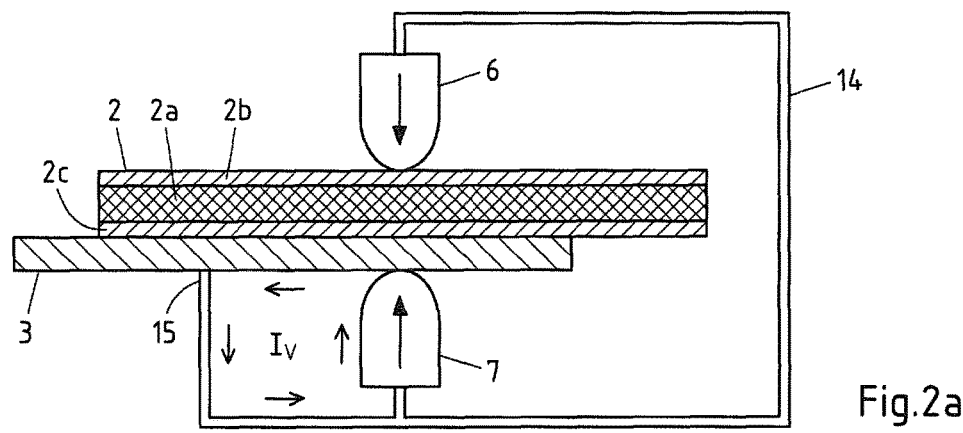
FIG. 2a is a sectional schematic view of the example device of FIG. 1 during a first time period when a preheating current $I_V$ flows between an example electrical bridge and an example welding electrode.
Figure 2B:
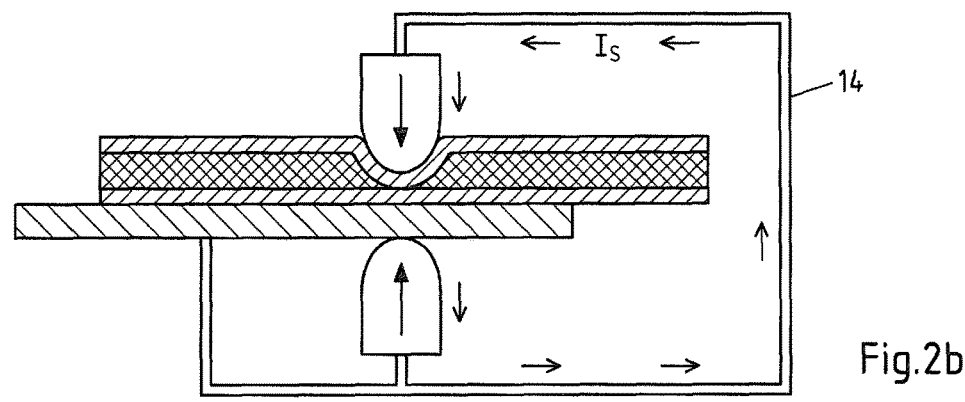
FIG. 2b is a sectional schematic view of the example device of FIG. 1 during a second time period when a welding current $I_S$ flows and an example welding electrode imposes a force upon a welding region.
Figure 2C:
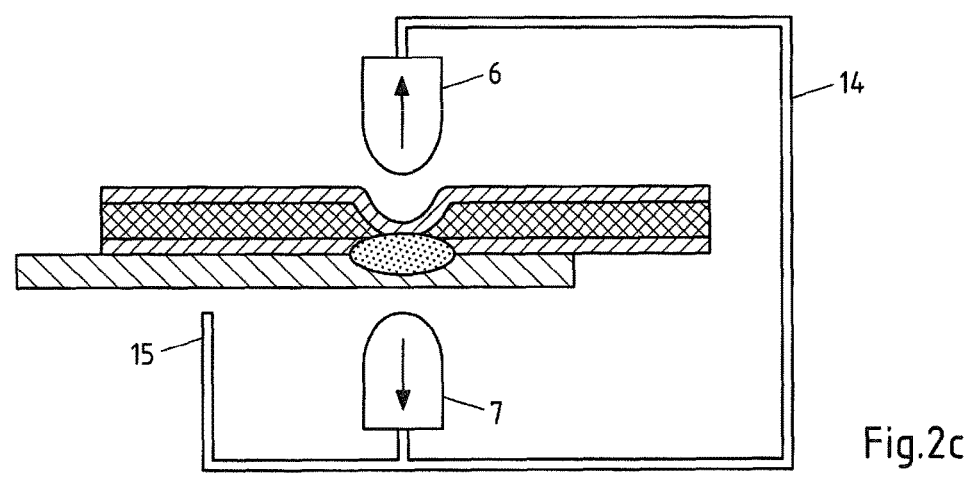
FIG. 2c is a sectional schematic view of the example device of FIG. 1 during a third time period when example welding tongues are opened after an example sandwich sheet has been welded to a metallic component.

FIGS. 2a, 2b, and 2c schematically show an exemplary embodiment of the device according to the invention, configured as welding tongs 14, at three different points in time during carrying out of one of the method according to the invention. The welding tongs 14 are shown in FIG. 2a, wherein the electrodes 6, 7 of the welding tongs 14, and an electrical bridge 15 are pressed against the sandwich sheet 2 or against the component 3, respectively. As is indicated in FIG. 2a, only the pre-heating current $I_V$ which flows between the electrical bridge 15 and the welding electrode 7 is initially switched on. Said pre-heating current $I_V$ leads to heating of the welding region, such that the plastics may displaced from the welding region by impinging the welding electrode 6 with a force. This is shown in FIG. 2b. During the further progress, the first electrical circuit is closed for the welding procedure to commence, and the second electrical circuit for pre-heating is interrupted. The welding current $I_S$ flows as is indicated in FIG. 2b. Thereafter, once welding the lightweight sheet 2 to the metallic component 3 has been carried out, the welding tongs 14 are opened and are guided to the next welding position, for example by a robot (not illustrated).

Figure 3:
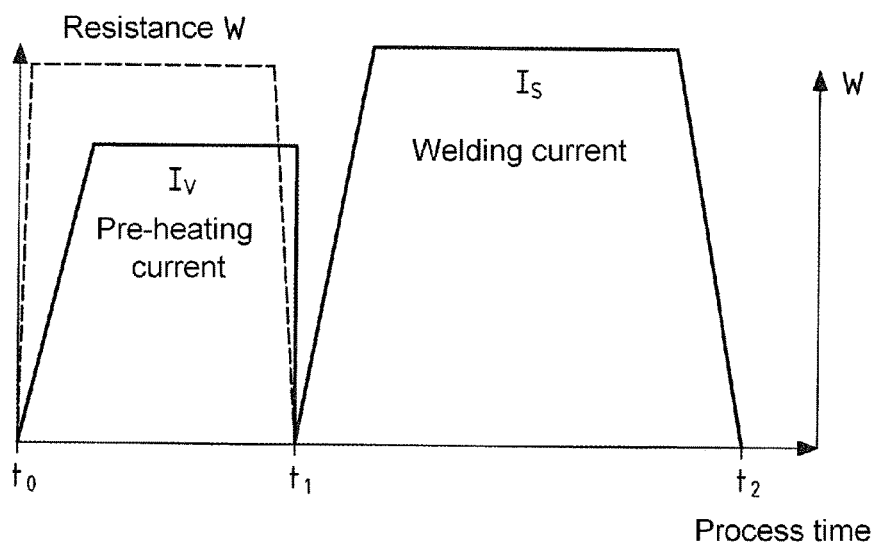
FIG. 3 is a graph representing temporal profiles of electrical currents used in devices for resistance-welding sandwich sheets to metallic components.

The temporal profile of the pre-heating current $I_V$ and of the welding current $I_S$, according to an exemplary embodiment, is now illustrated in a time-current diagram in FIG. 3.

Moreover, the measured value of resistance, which is determined between the metallic cover layers of the sandwich sheet by way of the means for resistance measuring 13, is shown in a qualitative manner. At the commencement of the welding method at the time point $t_0$, a high resistance W is measured between the metallic cover sheets, and a pre-heating current $I_V$ is set. Moreover, at the time points $t_0$ to $t_1$, a force is exerted on the welding electrodes 6 and 7, such that the welding electrode 6 urges the metallic cover layer of the sandwich sheet in the direction of the opposite metallic cover layer once the plastics in the welding region 12 have softened, such that the plastics are displaced from the welding region. At the point in time at which the metallic cover layer 2b is in contact with the metallic cover layer 2c, the resistance W rapidly drops.

This may be used as a switching signal for switching on the welding current $I_S$. At the same time, the electrical pre-heating circuit $I_V$ may be interrupted. Subsequently, the welding current is held at a constant value for sufficient time from $t_1$ to $t_2$, such that welding may be performed in a controlled manner. Using the method according to the invention, sandwich sheets may thus be welded to further metallic components in a simple manner. Some example components include metal sheets, solid-metal sheets, and additional sandwich sheets, which may be present as flat or as already shaped parts. Moreover, the method may also be carried out by a device according to the invention which is configured as welding tongs, such that handling systems and robots may also perform automatic resistance-welding of sandwich sheets.

Figure 4:
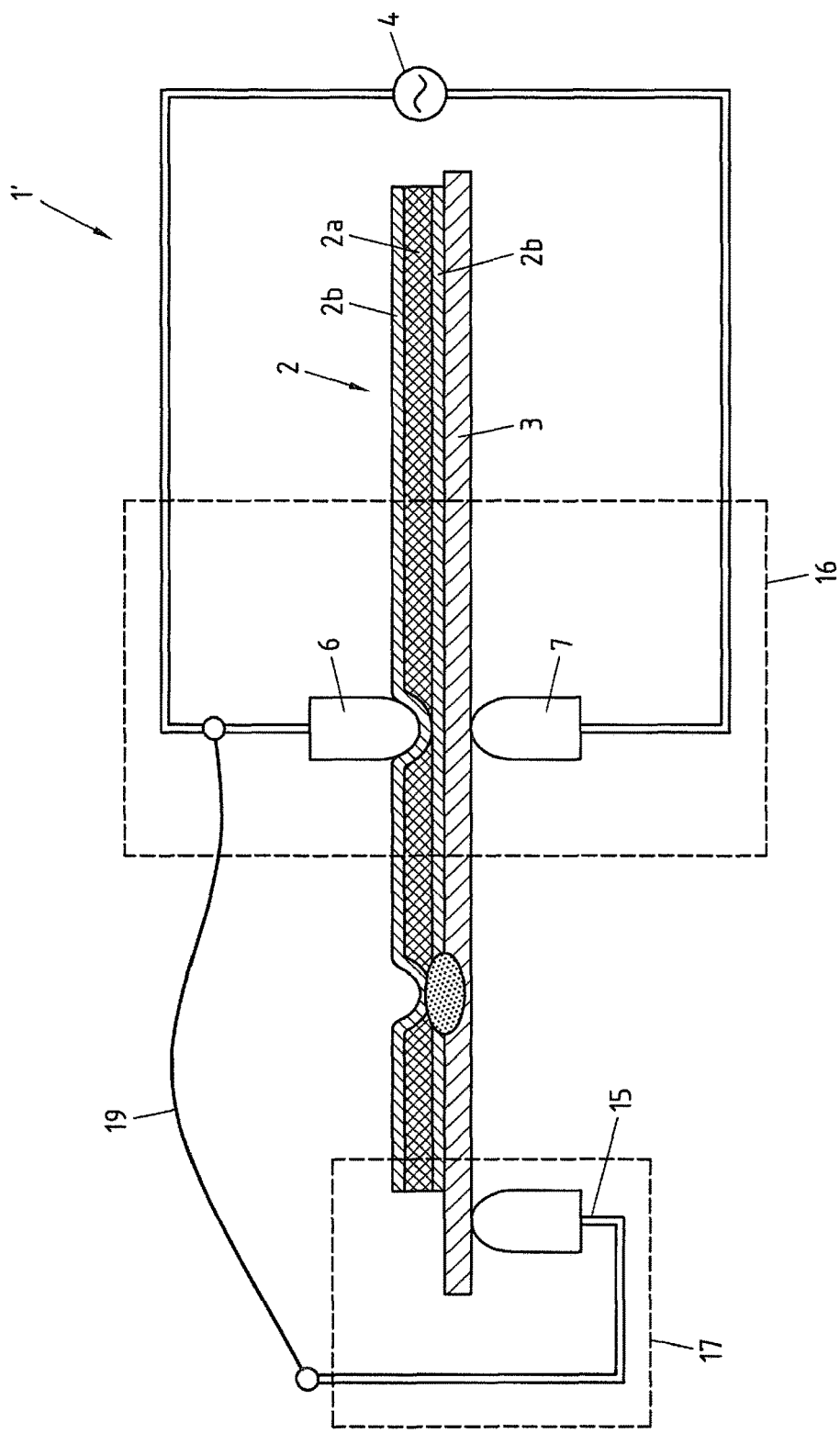
FIG. 4 is a sectional schematic view of another example device for resistance-welding an example sandwich sheet to an example metallic component, wherein example welding tongs and example electrodes can be moved, for example, by a first handling system, a gantry system, or a robot.
Figure 5:
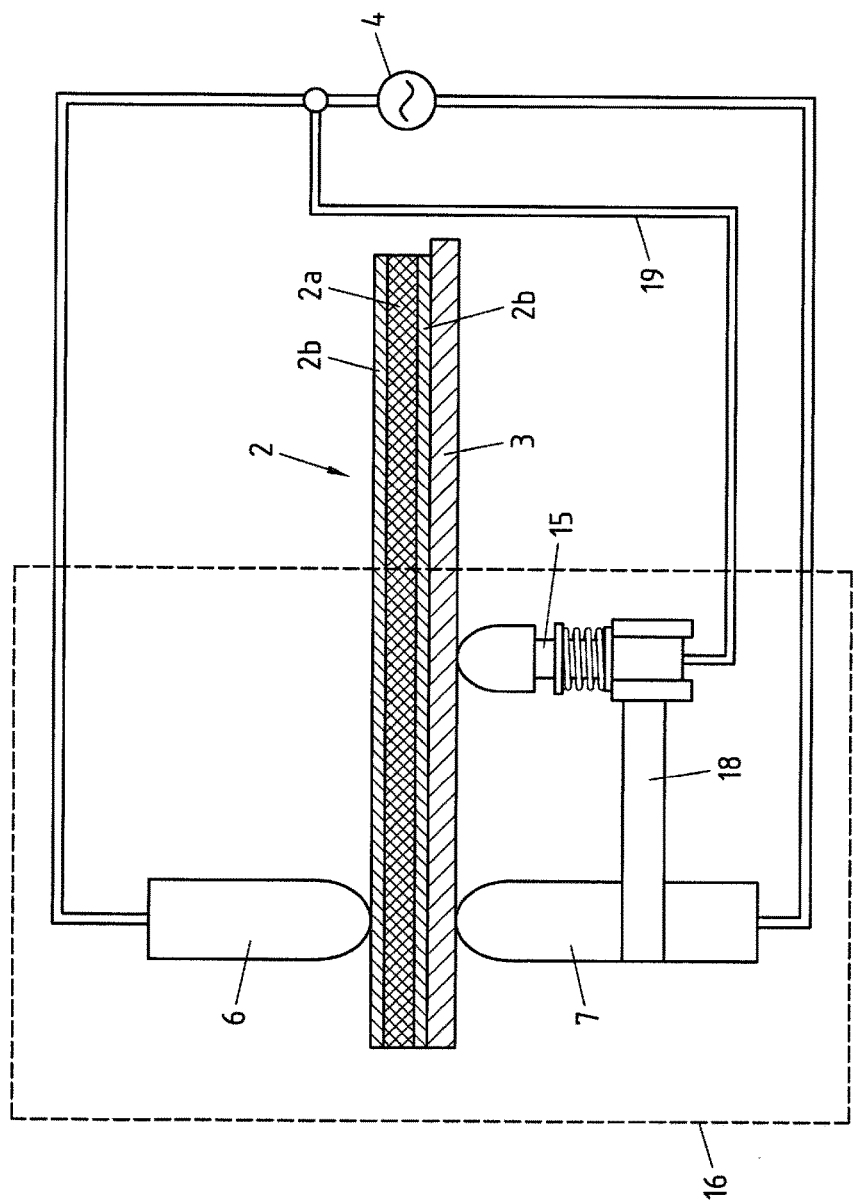
FIG. 5 is a sectional schematic view of another example device for resistance-welding an example sandwich sheet to an example metallic component, wherein an example electrical bridge is configured as a shunt electrode.

FIG. 4 in a schematic sectional view shows a further exemplary embodiment of a device 1' for resistance-welding a sandwich sheet 2, in which exemplary embodiment the electrodes 6, 7 which may be configured as parts of welding tongs, for example, are moved by way of a first handling system, gantry system, or a robot 16 to the respective welding position, and in which the electrical bridge 15, presently likewise configured as a contact electrode, follows so as to be guided by a second handling system, gantry system, or a second robot 17. The second electrical bridge 15 is connected to the voltage source or current source 4, respectively, by way of electrical lines 19 and guarantees that the pre-heating current flow only flows through delimited spatial regions of the metallic component 3. In this way, unintentional heating of those regions of the metallic component 3 that are not envisaged for joining may be prevented. FIG. 5 shows an exemplary embodiment which is further simplified, likewise in a schematic sectional view. The electrical bridge 15 is configured as a shunt electrode and by way of a rigid and electrically isolating mounting 18 is disposed so as to be fixedly spaced apart from the welding electrode 7, such that there is a short spacing between the shunt electrode 15 and the welding electrode 7 and the corresponding pre-heating current flows in the metallic component 3. The shunt electrode 15 by way of electrical lines 19 is also connected to the voltage source or current source 4, respectively. Both welding electrodes 6, 7 and the shunt electrode 15 may be guided by way of a handling system, a gantry system, or a robot 16 to the welding position, for example. On account of the rigid spacing, the requirement of a further handling system or of a robot for guaranteeing short current paths for the pre-heating current is dispensed with. In the exemplary embodiments illustrated in FIGS. 4 and 5, resistance measuring may be performed by way of the electrodes which are in contact with the metallic component 3 or with the sandwich sheet 2, respectively. However, the means for resistance measuring are not illustrated in the two figures.

What is claimed is:

1. A method for resistance-welding a sandwich sheet to at least one metallic component, wherein the sandwich sheet is comprised of a thermoplastic layer disposed between a first metallic cover layer and a second metallic cover layer, the method comprising:

positioning a first welding electrode adjacent to the first metallic cover layer of the sandwich sheet;

positioning a second welding electrode opposite the first welding electrode and adjacent to the at least one metallic component, wherein the at least one metallic component is adjacent to the second metallic cover layer of the sandwich sheet, wherein a first electrical circuit comprises the first and second welding electrodes;

heating a contact region between the second welding electrode and the at least one metallic component by a current flow in a second electrical circuit that comprises the second welding electrode, the at least one metallic component, and a current bridge that is in contact with the at least one metallic component, whereby the current flow of the second electrical circuit bypasses the first metallic cover layer of the sandwich sheet and the first welding electrode;

heating a welding region of the sandwich sheet so that the thermoplastic layer softens;

compressing the first and second metallic cover layers so as to displace the thermoplastic layer from the welding region; and interconnecting the first and second metallic cover layers and the at least one metallic component electrically by an electrical current flow through the first welding electrode and the second welding electrode in the first electrical circuit.

2. The method of claim 1 wherein compressing the first and second metallic cover layers comprises using force impingement of the first and second welding electrodes.

3. The method of claim 1 further comprising interrupting the second electrical circuit while interconnecting the first and second metallic cover layers and the at least one metallic component electrically.

4. The method of claim 1 further comprising measuring an electrical resistance between the first and second metallic cover layers of the sandwich sheet.

5. The method of claim 4 further comprising controlling currents in at least one of the first or second electrical circuits depending on measurements of the electrical resistance.

6. The method of claim 1 further comprising maintaining a constant current in at least one of the first electrical circuit or the second electrical circuit at least on occasion.

7. A method for resistance-welding a metallic component to a sandwich sheet comprised of a thermoplastic layer disposed between a first metallic cover layer and a second metallic cover layer, the method comprising:

positioning the metallic component and the sandwich sheet between a first welding electrode and a second welding electrode such that the first welding electrode is adjacent to the first metallic cover layer, such that the second metallic cover layer is adjacent to the metallic component, and such that the second welding electrode is adjacent to the metallic component;

passing a current through a circuit comprised of the second welding electrode, an electrical bridge that is in contact with the metallic component and is spaced apart from the sandwich sheet, and the metallic component so as to increase a temperature of the thermoplastic layer and soften the thermoplastic layer in a welding region, the current of the circuit bypassing the first metallic cover layer and the first welding electrode;

compressing the first and second metallic cover layers such that the softened thermoplastic layer is displaced from the welding region; and interconnecting the first metallic cover layer, the second metallic cover layer, and the metallic component electrically by passing an electrical current through the first welding electrode and the second welding electrode.

* * * * *